United States Patent [19]

Haberrecker

[11] Patent Number: 4,819,260

[45] Date of Patent: Apr. 4, 1989

[54] X-RADIATOR WITH NON-MIGRATING FOCAL SPOT

[75] Inventor: Klaus Haberrecker, Bubenreuth, Fed. Rep. of Germany

[73] Assignee: Siemens Aktiengesellschaft, Berlin and Munich, Fed. Rep. of Germany

[21] Appl. No.: 231,370

[22] Filed: Aug. 12, 1988

Related U.S. Application Data

[63] Continuation of Ser. No. 915,707, Oct. 6, 1986, abandoned.

[30] Foreign Application Priority Data

Nov. 28, 1985 [DE] Fed. Rep. of Germany ....... 3542127

[51] Int. Cl.$^{4}$ .......................... G01T 1/20; H01J 35/06

[52] U.S. Cl. ..................................... 378/137; 378/138

[58] Field of Search ............... 378/137, 135, 113, 125, 378/131, 41, 42.12, 205

[56] References Cited

U.S. PATENT DOCUMENTS

| | | | |
|---|---|---|---|
| 1,215,116 | 2/1917 | Coolidge | 378/138 |
| 2,946,892 | 7/1960 | Bas-Taymaz . | |
| 3,250,916 | 5/1966 | Rogers | 378/41 |
| 3,838,284 | 9/1974 | McIntyre et al. | 250/385 |
| 4,066,902 | 1/1978 | Lemay | 378/12 |
| 4,112,397 | 9/1978 | Randall . | |
| 4,160,909 | 7/1979 | Froggatt . | |
| 4,247,780 | 1/1981 | Webber et al. | 378/205 |
| 4,250,425 | 2/1981 | Gabbay et al. | 378/12 |
| 4,442,539 | 4/1984 | Aichinger et al. . | |
| 4,577,340 | 3/1986 | Carlson et al. | 378/125 |
| 4,631,744 | 12/1986 | Haberrecker | 378/138 |
| 4,675,892 | 6/1987 | Plessis et al. | 378/205 |

FOREIGN PATENT DOCUMENTS

| | | | |
|---|---|---|---|
| 3222514 | 3/1984 | Fed. Rep. of Germany | 378/41 |

*Primary Examiner*—Carolyn E. Fields
*Assistant Examiner*—Joseph A. Hynds
*Attorney, Agent, or Firm*—Hill, Van Santen Steadman & Simpson

[57] ABSTRACT

An x-radiator has a rotating anode on which electrons emitted by a thermionic cathode are incident to produce an x-ray beam. The electron stream is incident on the anode at a focal spot. The focal spot on the anode is prevented from migrating laterally from a selected point by a magnetic field generated by a coil acting on the electron stream. The position of the emitted x-ray beam is monitored by a detector, and upon a change in position of the x-ray beam, corresponding to a migration of the focal spot, the detector supplies a signal to a control unit for the coil which adjusts the magnetic field to maintain the electron stream at the desired focal spot.

5 Claims, 2 Drawing Sheets

X-RADIATOR WITH NON-MIGRATING FOCAL SPOT

This is a continuation of application Ser. No. 915,707, filed Oct. 6, 1986 now abandoned.

BACKGROUND OF THE INVENTION

1. Field of the Invention

The present invention relates to x-radiators, and in particular to an x-radiator having means for preventing migration of the focal spot of the electron stream on a rotating anode.

2. Description of the Prior Art

An x-radiator is described in British Pat. No. 365 432, wherein a thermionic cathode generates an electron stream which is incident on an anode disk or anode dish, the electron stream being deflected by an external magnetic field so as to be incident on an off-center focal spot on the anode. The x-radiator described in British Pat. No. 365 432 was developed at the time that the principle of rotating anodes was first introduced into x-ray technology, and the entire tube, with the cathode and anode rigidly mounted therein, was intended to be rotated about the longitudinal axis of the arrangement. The external magnetic field was stationary, and the entire tube arrangement was displaced with respect to the magnetic field so as to result in the desired deflection of the electrons. Due to substantial mechanical difficulties, this arrangement did not prove to be practical.

In rotating anode x-ray tubes which were subsequently developed, only the anode itself was made to rotate. In such tubes, the cathode is rigidly mounted in the bulb of the tube at a radial distance from the longitudinal axis of the arrangement, which is coaxial with the center of the anode. The spacing corresponds to the radius of the path of the focal spot. It is thus not necessary in conventional tubes of this type to locate the electron stream by a magnetic field. The electron stream may nonetheless be influenced by extraneous magnetic fields, such as the earth's magnetic field, and the path of the stream is correspondingly deflected. This causes a slight change in the position of the focal spot on the anode Since the position of the focal spot determines the position of the emitted x-ray beam, such migration is undesirable, particularly in computer tomography, wherein a radiation source having a specific position is of importance.

Migration of the focal spot in convention x-ray tubes may occur for other reasons such as thermal expansion of components of the tube occurring during manufactured or during operation, which causes geometrical changes in the relative positions of the electrodes. The rotating anode can also cause migration of the focal spot due to vibrations induced by the mechanical rotation

SUMMARY OF THE INVENTION

It is an object of the present invention to provide a rotating anode x-radiator wherein the focal spot does not migrate and thus an x-ray beam of uniform distribution and constant position is emitted.

The above object is achieved in accordance with the principles of the present invention in that a detector is provided in the path of the emitted x-ray beam which monitors the position of the x-ray beam. A means such as a coil for generating a magnetic field in the space between the cathode and the anode, and which thus can control the position of the stream of electrons and the focal spot on the anode, is also provided. The detector is connected through a control unit to a current source for the coil, and upon the detection of movement of the x-ray beam a signal is provided to the control unit which in turn adjusts the magnetic field to maintain the electron stream and the focal spot at the selected position.

The invention disclosed herein proceeds on the basis that a lateral stabilization of the position of the x-ray beam focus relative to the radius of the path of the focal spot in rotating anode x-ray tubes results in sufficiently uniform x-ray beam emission. The focal spot normally has an elongated rectangular shape, and the narrow side of such a vocal spot lies in this direction. The long side of the focal spot lies in the direction of the radius of the anode. A dislocation of the focal spot in the radial direction occurs only with the sine of the emission angle, and is fully effective transversely relative thereto. This recognition simplifies stabilization of the focal spot because the focal spot need only be fixed in one direction, i.e., in the direction of the path of the focal spot proceeding transversely relative to the anode radius. It is thus necessary to provide means for adjusting the position of the focal spot which is effective only in this direction.

In this embodiment, as in the aforementioned British Pat. No. 365 432, the effect of the magnetic field can be promoted by making the cathode head and, under certain conditions, the anode of non-magnetic material.

The x-ray beam is stabilized in accordance with the principles of the present invention by using a detector in the form of an electro-optical element disposed at a lateral marginal ray of the x-ray and/or light beam emanating from the focal spot so that the active detecting area of the face of the detector is only partly illuminated by the beam. A movement of the boundary of the beam then generates a change in the ratio of radiated and non-radiated portions of the detector surface. This will result in a corresponding change in one or more electrical characteristics, for example, the conductivity, of the element. This electrical characteristic change can be used to generate a control signal and the strength of the magnetic field acting on the electron stream can be adjusted in either direction to bring the electron beam back to the desired focal spot, and thus to bring the x-ray beam back to the desired position.

In contrast to conventional x-ray tubes, wherein the cathode head consists of magnetic material, for example, nickel or special soft iron, the current necessary for generating the stabilizing magnetic field can be reduced by 70% in a radiator in accordance with the principles of the present invention using a non-magnetic cathode head. This also simplifies the apparatus which is required for driving the magnetic coil. Because the stabilization coil is disposed outside of the vacuum bulb of the tube, such simplification is important.

A suitable material for the cathode head in the claimed subject matter is anti-magnetic steel known as Remanit 4550. This material has a low magnetization constant $\mu$ of about 1. This material is essential chrome-nickel steel which, in addition to having sufficient strength, is non-magnetic during operation of the cathode in the high vacuum of an x-ray tube. As described in U.S. Pat. No. 3,875,028, the cathode head may alternatively consist of ceramic such as, for example, aluminum oxide, and can be provided with a coating having a high electron affinity.

The coil used to deflect the electron stream may be divided into sections having a spacing of 1 to 2 mm from each other. Such coils can only be applied in a relatively large area around the tube, rather than in the tube, thus relatively high currents and voltages are required to generate the necessary magnetic fields. Given manufacture of the cathode head of non-magnetic material, the electrical outlay is considerably reduced. Moreover, no remanent fields, which can exert an undefined influence on the position of the focus, will be present.

DESCRIPTION OF THE PREFERRED EMBODIMENTS

Figure 1:
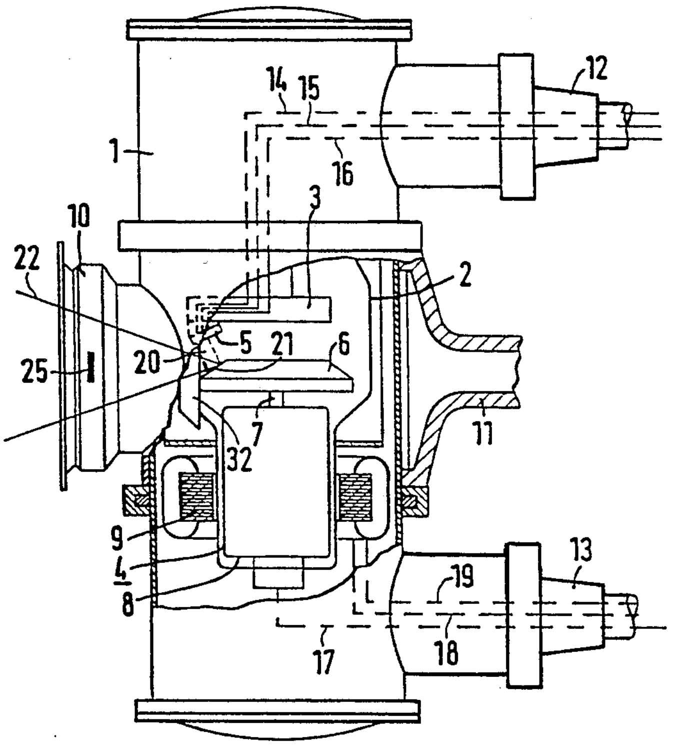
FIG. 1 is a side view, partly broken away, of an x-radiator constructed in accordance with the principles of the present invention.
Figure 2:
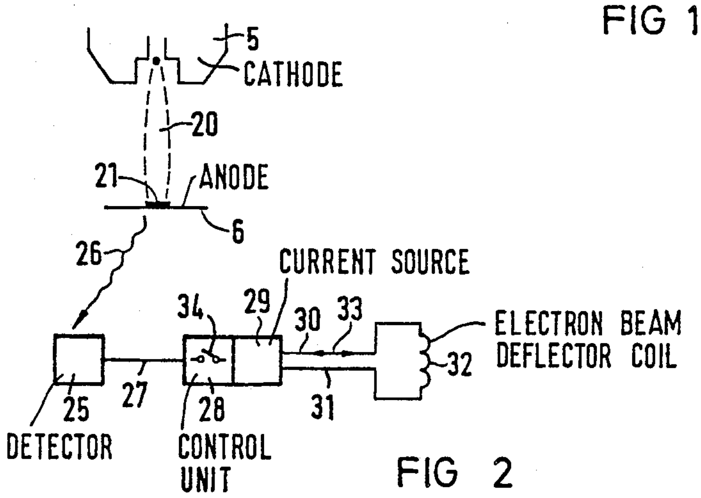
FIG. 2 is a schematic block diagram showing components cooperating for positioning the x-ray beam in the radiator shown in FIG. 1.

An x-radiator constructed in accordance with the principles of the present invention is shown in FIG. 1, which includes a tube head 1 with a vacuum tube 2 therein. The tube has a cathode arrangement generally referenced at 3 and an anode arrangement generally referenced at 4. The cathode arrangement 3 includes a cathode head 5 containing a thermionic cathode having two separately switchable filaments. The anode arrangement 4 includes an anode dish 6 disposed in front of and spaced from the cathode head 5. The anode dish 6 is connected via a shaft 7 to a rotor 8 for rotating the anode dish 6 in a known manner. A stator 9 is disposed outside of the tube 2 for operating the rotor 8. A beam exit tube 10 is connected to the tube head 1 at a side thereof from which the x-ray beam exits. The tube head 1 is disposed to the remainder of an x-ray apparatus by a bracket 11 in a known manner.

Terminals 12 and 13 connect the electrical supply lines to the components within the tube 2. Supply lines 14, 15 and 16 for the cathode head 5 are conducted through the terminal 12. A line 17 for applying the anode voltages conducted through the terminal 13. Lines 18 and 19 supply the operating current for the stator 9.

Operation of the x-ray tube 2 is in a known manner. A filament voltage for the cathode 5 is applied across the lines 14 and 15 or across the lines 15 and 16. A voltage to draw the electrons emitted by the cathode head 5 toward the anode 6 is applied between lines 17 and one of the lines 14, 15 or 16. An electron stream 20 then emerges from the cathode head 5 and is incident on the anode dish 6 at a focal spot 21. An x-ray beam 22 is generated at this location and exits through the beam exit tube 10.

A detector 25 is disposed within the path of the beam 22 at a lateral edge or marginal ray thereof, reference 26. The detector 25 is mounted within the exit tube 10 so as to have an optical (line of sight) connection to the focal spot 21.

Figure 3:
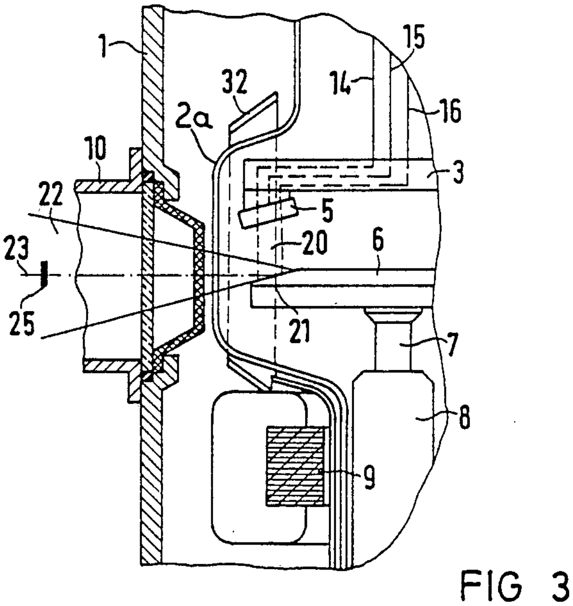
FIG. 3 is an enlarged sectional view showing further details of the radiator of FIG. 1.

The detector 25 may be an opto-electrical transducer which generates electrical signals upon deviation of the focal spot 21 from a desired location, such as by changing its conductivity in correspondence with the size of the surface portion irradiated by the beam 22. The detector 25 is connected to a control unit 28 via a line 27. The control unit 28 controls a current source 29 for the deflector coil 32 via lines 30 and 31. The double arrow 33 indicates that the current supply to the deflector coil 32 can be in both directions as needed. The direction is prescribed by the signal supplied from the detector 25. As shown in FIG. 3, the x-ray tube 2 has an envelope with a projection *2a* through which the x-ray beam 22 exits the tube 2. The cathode 5 is disposed in the projection *2a* which is surrounded by the coil 32. Upon the occurrence of deviations or migration of the focal spot 21 from the desired location, the electron stream 20 is returned to the focal spot 21 by adjustment of the strength and/or direction of the magnetic field generated by the deflector coil 32. The coil 32 is disposed substantially parallel to the direction of propagation of the electron stream 20 and generates a magnetic field in the direction toward the center of the anode dish 6 parallel to a central ray 23 of the beam 22. A deflection of the stream 20 in the desired manner is then possible using this magnetic field. The magnetic field generated by the coil 32 does not influence the cathode head 5 because this consists of non-magnetic material, such as Remanit 4550.

I claim as my invention:

1. An x-ray assembly comprising:
   - an x-ray tube having an envelope with a projection forming a beam exit port;
   - a cathode disposed in said projection consisting of non-magnetic material and an anode dish spaced from said cathode, said anode dish and cathode disposed in said envelope, said cathode being disposed eccentrically with respect to a center of said anode dish and emitting an electron stream at a focal spot on said anode dish from which an x-ray beam is emitted through said projection;
   - means for rotating said anode dish;
   - coil means surrounding said projection and said x-ray beam for generating a magnetic field at least in the space between said anode dish and cathode substantially perpendicular to the direction of propagation of said electron stream;
   - a sensor means disposed in the path of said x-ray beam for detecting the position of said x-ray beam, and generating a signal corresponding to said position; and
   - means for adjusting the magnetic field generated by said coil means in response to said signal from said sensor means such that migration of said focal spot on said anode dish is corrected.

2. An x-radiator as claimed in claim, wherein said cathode consists of non-magnetic steel.

3. An x-radiator as claimed in claim 1, wherein said sensor means is an element having electrical properties which vary under the influence of x-rays, said element being disposed at an edge of said x-ray beam such that a portion of said element is not radiated by said x-ray beam.

4. An x-radiator as claimed in claim 1, wherein said means for generating a magnetic field is a coil, wherein said means for adjusting said magnetic field includes a current source connected to said coil and a control unit connected to said sensor for controlling said current source, and wherein said control unit includes a means for switching said current source for laterally displacing said electron stream by said coil.

5. An x-ray tube assembly comprising:
   - an x-ray tube having an envelope with a projection forming a beam exit port and having a cathode disposed in said projection consisting of non-magnetic material and an anode dish spaced from said cathode in said envelope;

means for rotating said anode dish about an axis;

said cathode being disposed eccentrically with respect to said axis and generating an electron stream at a focal spot on said anode dish from which an x-ray beam is emitted through said projection;

a housing in which said x-ray tube is disposed having a beam exit tube aligned with said projection of said envelope of said x-ray tube through which said x-ray beam exits said housing;

a coil surrounding said projection and said x-ray beam generating a magnetic field at least in the space between said anode dish and cathode perpendicular to said electron stream;

a sensor means disposed in said beam exit tube and having a surface which is partially radiated by said x-ray beam for generating an electrical signal indicating the position of said x-ray beam corresponding to the amount of said surface thereof which is radiated by said x-ray beam; and means connected to said sensor means for adjusting the magnetic field base on said signal from said sensor such that migration of said focal spot on said anode dish is corrected upon detection of movement of said position of said x-ray beam by said sensor means.

* * * * *